Patented June 6, 1933

1,912,593

UNITED STATES PATENT OFFICE

LEOPOLD POLLAK, OF AUSSIG-ON-THE-ELBE, CZECHOSLOVAKIA, ASSIGNOR TO I. G. FARBENINDUSTRIE AKTIENGESELLSCHAFT, OF FRANKFORT-ON-THE-MAIN, GERMANY

SYNTHETIC TANNING MATERIAL AND PROCESS OF PRODUCING SAME

No Drawing. Application filed April 21, 1930, Serial No. 446,185, and in Czechoslovakia April 23, 1929.

The present invention relates to the production of synthetic tanning materials and preparations containing the same.

It is already known that synthetic tans can be obtained by condensing resorcinol or another polyhydric phenol with formaldehyde in the presence of hydrochloric acid at low temperatures in which process however lower or higher quantities of water-insoluble products may occur, especially when quantities of more than ½ molecular proportion of aldehyde have been allowed to act on each molecular proportion of a polyhydric phenol.

I have found that valuable tanning materials can be obtained by condensing a urea and formaldehyde with a polyhydric phenol or with a mixture of a polyhydric phenol and a vegetable tanning material, whereby water-soluble nitrogenous tanning materials are obtained. The condensation is carried out in a weakly acid medium, i. e. in the presence of very small quantities of an acid condensing agent, and at a low temperature such as below 50° C., a temperature of about or below 35° C. being preferred in most cases. Any acid reacting substances may be employed as condensing agents, but generally hydrochloric acid will be employed, because it is always available and cheap. The quantity of acid condensing agent employed is generally less than 2 per cent by weight of the quantity of urea employed and usually a few drops, for example of concentrated hydrochloric acid per each 100 grams of urea are sufficient for accelerating the reaction. The quantity of condensing agent must however not exceed the aforesaid limits, since otherwise water-insoluble products might be obtained. Polyhydric phenols particularly suitable for condensation with urea and aliphatic aldehydes are for example the easily water-soluble resorcinol, cresorcinol (1-CH₃, 2.4-dihydroxy benzene) or phloroglucinol and pyrogallol, whereas the more difficultly water-soluble polyhydric phenols, such as catechol, quinol or hydroxy-quinol are less advantageous.

The reaction proceeds very smoothly on working with the said minute quantities of acid condensing agent and at a comparatively low temperature, such as room temperature, the reaction being regulated and smothered apparently by the formation of an intermediate condensation of the urea with the aliphatic aldehydes which latter reaction is endothermic. In this manner ½ molecular proportion of the aliphatic aldehyde or still higher quantities may be brought into reaction with each molecular proportion of polyhydric phenol. If however the reaction temperature should rise by the heat evolved it may be easily decreased by cooling to say 35° C.

The reaction can be rendered quite uniform and smooth by stirring and it is carried on until the free aldehyde has disappeared, which result is easily attained, in the case of working with formaldehyde for example, as soon as the typical smell of aldehyde has disappeared. The finished condensation product can be then heated, if desired, to a temperature up to 100° C., whereby it is apparently converted into a polymeric and colloidal form which possesses a higher molecular weight than the initial condensation product.

The water-soluble condensation products obtained according to the present invention contain from about 10 to about 15 per cent by weight of nitrogen and possess very high tanning and filling properties and furnish a from white to pink leather which is considerably weighted and nevertheless very supple. It may be assumed that the products according to the present invention are ethers of the polyhydric phenol and an alkylol urea corresponding to a formula R–A–NH–CO–NH₂ in which R denotes the radicle of a polyhydric phenol and A an alkyl radicle corresponding to the aldehyde employed, but the nature of the products has not been definitely ascertained.

When more than ½ molecular proportion of formaldehyde has been employed for each molecular proportion of the polyhydric phenol the resulting products are sometimes difficultly soluble in water, but they may be rendered completely soluble in water by converting them into the solid state in the presence of a small quantity of ammonia or caustic soda or similar alkali in quantities of say 1 per cent by weight of the products, whereby amber colored resinous water-soluble lumps are obtained which possess a highly efficient and quick tanning action. When acetaldehyde is employed in the condensation, quantities of more than one molecular proportion can be introduced into the polyhydric phenol without difficulty and completely water-soluble products are obtained, which contain up to 15 per cent their weight of nitrogen and even more, when the condensation products prepared at about 35° C. are carefully warmed to say from 75° to 90° C. depending on the quantity of urea employed. These products show particularly valuable tanning and weighting effects, but the aforesaid heating should not considerably exceed 100° C. or should not be proceeded with for a too long period of time, since otherwise insoluble products might be obtained. In most cases I prefer to employ one molecular proportion of urea for from one to two proportions of aldehyde and from one to two proportions of polyhydric phenol.

As described above a portion of the polyhydric phenols in the reaction mixtures may be replaced by vegetable tanning materials or by extracts from such tanning materials, whereby completely water-soluble products containing nitrogen are obtained which possess the tanning properties of the vegetable tanning materials employed, but which furnish a leather with much paler shades than can be obtained with the vegetable tanning materials solely, as for example with manglebark.

The process according to the present invention allows of obtaining tanning materials of very high molecular weight which nevertheless are soluble, which effect is apparently due to the regulating and smothering action of the urea present. On the other hand the results of the present process are most surprising, since urea is well known to give water-insoluble condensation products with from ⅓ to 2 molecular proportions of formaldehyde per each molecular proportions of urea on condensing the said materials in the presence of an acid condensing agent. The formation of insoluble products occurs however only within the leather tanned with the new tanning materials obtained in accordance with the present invention to which effect the considerable weighting of the leather tanned with the said products is due. This considerable weighting effect can be further increased by treating the leather tanned with the tanning agents prepared in accordance with the present invention with an aldehyde such as formaldehyde, acetaldehyde and the like, if desired in the presence of small quantities of acid reacting agents which modification allows of obtaining not only a formation of high molecular compounds within the leather, but also an improved fixation of the tanning material within the leather.

The following examples will further illustrate how this invention may be carried out in practice but the invention is not limited thereto. The parts are by weight.

*Example 1*

100 parts of urea are intimately mixed with 183 parts of resorcinol and a mixture of 113 parts of 35 per cent aqueous formaldehyde and about 0.8 part of concentrated hydrochloric acid is added. The whole is then stirred while temporarily cooling until all crystals have disappeared and the mixture is transparent and viscous and no smell of formaldehyde can be detected. The reaction mass is then carefully heated to about 90° C. until it reacts neutral to Congo paper, which result can be accelerated by adding a very small quantity of an alkaline reacting agent. The product obtained can be directly employed for tanning. By extracting the aqueous solution with the aid of ethyl ether a fraction can be obtained the tanning and weighting properties of which are lower than those of the complete reaction product.

*Example 2*

100 parts of urea are intimately mixed with 366 parts of resorcinol and a mixture of 113 parts of 35 per cent aqueous formaldehyde and about 0.8 part of concentrated hydrochloric acid is added. The mixture is then stirred while temporarily cooling until all crystals have disappeared and the mixture is transparent and viscous and no smell of formaldehyde can be detected. The reaction mass is then carefully heated to about 90° C. until it reacts neutral to Congo paper, which result can be accelerated by adding a very small quantity of an alkaline reacting agent. About 50 per cent of the product obtained is soluble in ethyl ether, but the tanning value of the portion extracted is lower than that of the complete reaction product. The tanning effect of the whole product is equivalent to the highest tanning values of first quality vegetable tanning extracts, i. e. 100 grams of hide powder absorb from 60 to 88 grams of tanning material.

*Example 3*

150 parts of urea are intimately mixed with 274 parts of resorcinol and intimately stirred with 257.5 parts of 35 per cent aqueous formaldehyde, the mixture being then left standing for about 16 hours while cooling; the clear viscous mass obtained does not precipitate gelatine from its solutions. After adding from 4 to 8 drops of concentrated hydrochloric acid to each 700 grams of the reaction mixture, the reaction mixture becomes warm which effect can be neutralized by cooling to about 30° C. The mixture is then stirred until the smell of formaldehyde has disappeared and is then warmed at about 95° C. until the mass is neutral to Congo paper. The yellow product colloidally dissolves in water and in order to render it completely soluble in water the product is evaporated to dryness in the presence of about 2 per cent its weight of concentrated ammonia, if desired in thin layers or by spraying, whereby a product of the shade of amber with excellent tanning properies is obtained, the properties of the product being similar to those of the product obtained according to the foregoing example. The nitrogen content of the product is about 15 per cent.

*Example 4*

25 parts of urea and 91.5 parts of pyrogallol are intimately mixed and a mixture of 32.4 parts of 35 per cent aqueous formaldehyde and 0.1 part of concentrated hydrochloric acid is stirred into the mixture. The temperature rises quickly and the mixture is cooled in order to keep the reaction temperature at or below 35° C. After the smell of formaldehyde has disappeared the dark brown mass is warmed to about 90° C. for some time and an entirely water-soluble product with a very high tanning effect is obtained, the effect being about the same as that of the product described in Example 2.

*Example 5*

100 parts of urea and 366 parts of resorcinol are intimately mixed and 200 parts of 80 per cent aqueous acetaldehyde together with from 3 to 6 drops of concentrated hydrochloric acid per each 100 grams of urea are stirred into the mixture. The reaction mass becomes warm and the temperature is prevented from rising above 35° C. by cooling. The shade of the mass passes from green over blue to pure yellow and the practically solid mass is then warmed at about 90° C. until it is neutral to Congo paper or it is rendered neutral with the aid of caustic alkali. The product is completely soluble in water and constitutes a high valuable tanning material, the hydrogen ion concentration of which is about pH=5.1 and practically the same as that of quebracho extract.

*Example 6*

100 parts of urea are intimately mixed with 91.5 parts of resorcinol and 91.5 parts of ordinary quebracho extract, containing about 11 per cent of insoluble matter, whereupon 103.5 parts of 80 per cent aqueous acetaldehyde and from 3 to 5 drops of concentrated hydrochloric acid are added per each 100 grams of urea. The reaction mass which instantly achieves the red shade of quebracho and which grows slowly warm is intimately stirred and then warmed to about 90° C. The formation of lumps from the quebracho extract can be avoided by adding a small quantity of water. After heating for about one hour the mass is completely homogenized and soluble in cold water. In the place of the extract from quebracho, mangle-bark extract or chestnut-wood extract and the like vegetable tanning materials can be employed in varying quantities as well as the difficultly soluble phlobaphenes separated from crude quebracho extract, the so-called quebracho sludge.

*Example 7*

100 parts of urea and 366 parts of resorcinol are intimately mixed or fused whereupon, while carefully cooling, 310 parts of 80 per cent. aqueous acetaldehyde are added together with from 3 to 8 drops of concentrated hydrochloric acid per each 100 grams of urea employed. The reaction mixture is then kept standing while carefully cooling for from 2 to 3 hours, whereby the mass is rendered clear and assumes a yellowish shade. The mass is then carefully heated to a temperature not exceeding 75° C. until it becomes highly viscous. The product is completely soluble in water and possesses highly valuable tanning properties. When the temperature of heating has been increased to about 100° C. and for a longer period of time an insoluble product is obtained while the mass swells. When the reaction is carried out without the addition of urea a sudden evolution of heat occurs which nearly amounts to an explosion, the mass foams and becomes insoluble in water.

*Example 8*

150 parts of urea and 311 parts of resorcinol are intimately mixed and 310 parts of 80 per cent. aqueous acetaldehyde are added together with from 3 to 8 drops of concentrated hydrochloric acid per each 150 grams of urea, whereby only a slight increase of temperature occurs, so that, generally, cooling is not necessary. The mass is then heated to about 90° C., whereby its color passes from yellow to reddish yellow and the mass becomes highly viscous. The reaction is then stopped and a product which is completely soluble in water and possesses a high tanning value is obtained. By further heating, the mass is rendered insoluble in water while swelling. Leather tanned with the water-soluble product can be subjected to a treatment with some formaldehyde or acetaldehyde, if desired in the presence of water, or of water and a small quantity of an acid agent, whereby the percentage of tanning material which might be rinsed off from the leather on washing is considerably reduced due to the formation of difficultly soluble compounds.

What I claim is:—

1. The process for the production of tanning materials which comprises reacting with an aliphatic aldehyde containing from one to two carbon atoms on a polyhydric phenol containing from two to three hydroxyl groups in the presence of a urea at a temperature below 50° C.

2. The process for the production of tanning materials which comprises reacting with an aliphatic aldehyde containing from one to two carbon atoms on a polyhydric phenol containing from two to three hydroxyl groups and a vegetable tanning material in the presence of a urea at a temperature below 50° C.

3. The process for the production of tanning materials which comprises reacting with an aliphatic aldehyde containing from one to two carbon atoms on a polyhydric phenol readily soluble in water and containing from two to three hydroxyl groups in the presence of a urea at a temperature below 50° C. and in a weakly acid medium.

4. The process for the production of tanning materials which comprises reacting with an aliphatic aldehyde containing from one to two carbon atoms on a polyhydric phenol readily soluble in water and a vegetable tanning material in the presence of a urea at a temperature below 50° C. and in a weakly acid medium.

5. The process for the production of tanning materials which comprises reacting with from one to two molecular proportions of an aliphatic aldehyde on from one to two molecular proportions of a polyhydric phenol readily soluble in water in the presence of a urea at a temperature below 50° C. and in a weakly acid medium.

6. The process for the production of tanning materials which comprises reacting with an aliphatic aldehyde containing from one to two carbon atoms on a polyhydric phenol readily soluble in water in the presence of a urea at about 35° C. and in a weakly acid medium, and further warming the product obtained to a temperature not exceeding 100° C.

7. As new articles of manufacture water-soluble, tanning and weighting condensation products of an aliphatic aldehyde containing from one to two carbon atoms, a polyhydric phenol containing from two to three hydroxyl groups and a urea, having a nitrogen content from about 10 to about 15 per cent and presumably corresponding to the formula R-A-NH-CO-NH$_2$ in which R denotes the radicle of a polyhydric phenol containing from two to three hydroxyl groups and A an alkyl radicle containing from one to two carbon atoms.

8. As new articles of manufacture water-soluble, tanning and weighting condensation products of an aliphatic aldehyde containing from one to two carbon atoms, a polyhydric phenol readily soluble in water and containing from two to three hydroxyl groups and urea, having a nitrogen content from about 10 to about 15 per cent and presumably corresponding to the formula R-A-NH-CO-NH$_2$ in which R denotes the radicle of a polyhydric phenol containing from two to three hydroxyl groups and A an alkyl radicle containing from one to two carbon atoms.

9. As new articles of manufacture water-soluble, tanning and weighting condensation products of an aliphatic aldehyde containing from one to two carbon atoms, a polyhydric phenol containing from two to three hydroxyl groups readily soluble in water, a vegetable tanning material and a urea, having a nitrogen content from about 10 to about 15 per cent.

10. As new articles of manufacture water-soluble, tanning and weighting condensation products of formaldehyde, a polyhydric phenol readily soluble in water and containing from two to three hydroxyl groups and urea, having a nitrogen contact from about 10 to about 15 per cent and presumably corresponding to the formula R-A-NH-CO-NH$_2$ in which R denotes the radicle of a polyhydric phenol containing from two to three hydroxyl groups and A a methylene radicle.

11. As new articles of manufacture water-soluble, tanning and weighting condensation products of formaldehyde, resorcinol and urea, having a nitrogen content from about 10 to 15 per cent and presumably corresponding to the formula R-A-NH-CO-NH$_2$ in which R denotes the radicle of resorcinol and A a methylene radicle.

12. As a new article of manufacture tanned and weighted leather containing a condensation product of an aliphatic aldehyde containing from one to two carbon atoms, a polyhydric phenol containing from two to three hydroxyl groups and urea, having a nitrogen content from about 10 to about 15 per cent and presumably corresponding to the formula R-A-NH-CO-NH$_2$ in which R denotes the radicle of a polyhydric phenol containing from two to three hydroxyl groups and A an alkyl radicle containing from one to two carbon atoms.

13. The process for the production of tanning materials which comprises reacting with acetaldehyde on a polyhydric phenol readily soluble in water and containing from 2 to 3 hydroxyl groups in the presence of a urea at a temperature below 50° C. and in a weakly acid medium.

14. The process for the production of tanning materials which comprises reacting with aqueous acetaldehyde on resorcinol in the presence of a urea at a temperature below 50° C. and in a weakly acid medium.

15. The process for the production of tanning materials which comprises reacting with aqueous acetaldehyde on resorcinol in the presence of a urea at a temperature below 50° C. and in a weakly acid medium, and further warming the product obtained to a temperature not exceeding 100° C.

16. The process for the production of tanning materials which comprises reacting with aqueous acetaldehyde on resorcinol in the presence of urea and of very small quantities of hydrochloric acid at a temperature below 50° C. and further warming the product obtained to a temperature not exceeding 100° C.

17. The process for the production of tanning materials which comprises reacting with aqueous acetaldehyde on resorcinol and a vegetable tanning material in the presence of urea and of very small quantities of hydrochloric acid at a temperature below 50° C. and further warming the product obtained to a temperature not exceeding 100° C.

18. The process for the production of tanning materials which comprises reacting with aqueous acetaldehyde on resorcinol and on quebracho extract in the presence of urea and of very small quantities of hydrochloric acid at a temperature below 50° C., and further warming the product obtained to a temperature not exceeding 100° C.

19. Water-soluble, tanning and weighting condensation products of acetaldehyde, resorcinol, a vegetable tanning material and urea, having a nitrogen content from about 10 to about 15 per cent.

20. Water-soluble tanning and weighting condensation products of acetaldehyde, resorcinol, quebracho extract and urea, having a nitrogen content from about 10 to about 15 per cent.

In testimony whereof I have hereunto set my hand.

LEOPOLD POLLAK.